US008442737B2

(12) United States Patent
Seurer et al.

(10) Patent No.: US 8,442,737 B2
(45) Date of Patent: May 14, 2013

(54) METHOD FOR OPERATING A VEHICLE BRAKE SYSTEM AND VEHICLE BRAKE SYSTEM

(75) Inventors: Frank Seurer, Bad Vilbel (DE); Daniel Fischer, Schwalbach (DE); Stefan Stölzl, Weinheim (DE)

(73) Assignee: Continental Teves AG & Co. oHG (DE)

( * ) Notice: Subject to any disclaimer, the term of this patent is extended or adjusted under 35 U.S.C. 154(b) by 708 days.

(21) Appl. No.: 12/594,274

(22) PCT Filed: Apr. 3, 2008

(86) PCT No.: PCT/EP2008/054014
§ 371 (c)(1),
(2), (4) Date: Apr. 6, 2010

(87) PCT Pub. No.: WO2008/122568
PCT Pub. Date: Oct. 16, 2008

(65) Prior Publication Data
US 2010/0198475 A1 Aug. 5, 2010

(30) Foreign Application Priority Data

Apr. 5, 2007 (DE) .......................... 10 2007 016 422
Apr. 3, 2008 (DE) .......................... 10 2008 017 478

(51) Int. Cl.
*G06F 19/00* (2006.01)
(52) U.S. Cl.
USPC .................... 701/74; 701/22; 701/75; 701/82
(58) Field of Classification Search .......... 701/22, 701/70, 74, 75, 78, 82, 83; 303/151, 152, 303/9.62
See application file for complete search history.

(56) References Cited

U.S. PATENT DOCUMENTS

| 5,615,933 | A | 4/1997 | Kidston et al. |
| 7,040,721 | B2 | 5/2006 | Weiberle et al. |
| 7,104,617 | B2 | 9/2006 | Brown |
| 2003/0062770 | A1* | 4/2003 | Sasaki et al. .................. 303/152 |
| 2004/0212245 | A1* | 10/2004 | Tsunehara et al. ................ 303/3 |
| 2007/0018499 | A1 | 1/2007 | Kokubo et al. |

FOREIGN PATENT DOCUMENTS

| DE | 196 22 017 A1 | 12/1996 |
| DE | 199 55 094 A1 | 5/2001 |
| DE | 103 41 678 A1 | 3/2004 |
| DE | 103 19 663 A1 | 11/2004 |
| DE | 10 2004 061 107 A1 | 2/2006 |
| WO | WO 2005/110827 A1 | 11/2005 |

* cited by examiner

*Primary Examiner* — Richard M. Camby
(74) *Attorney, Agent, or Firm* — RatnerPrestia

(57) ABSTRACT

A method for operating a vehicle braking system for motor vehicles including a hybrid or electric drive and hydraulically actutable wheel brakes on the front axle, wherein the wheels associated with the rear axle are driven at least partially by an electric motor that can be operated as a generator to recover braking energy and, in generator mode, exerts a braking force on the vehicle wheel associated with the respective axle, thereby generating a drag torque including the braking torque and the regeneration torque of the electric drive, the drag torque being separately regulatable on the front and rear axles. To prevent overbraking of the rear axle and a loss of driving stability of the vehicle, a regeneration torque acting on the rear axle is controlled or regulated such that the drag torque acting on the rear axle does not exceed a maximum drag torque value associated with that axle.

13 Claims, 1 Drawing Sheet

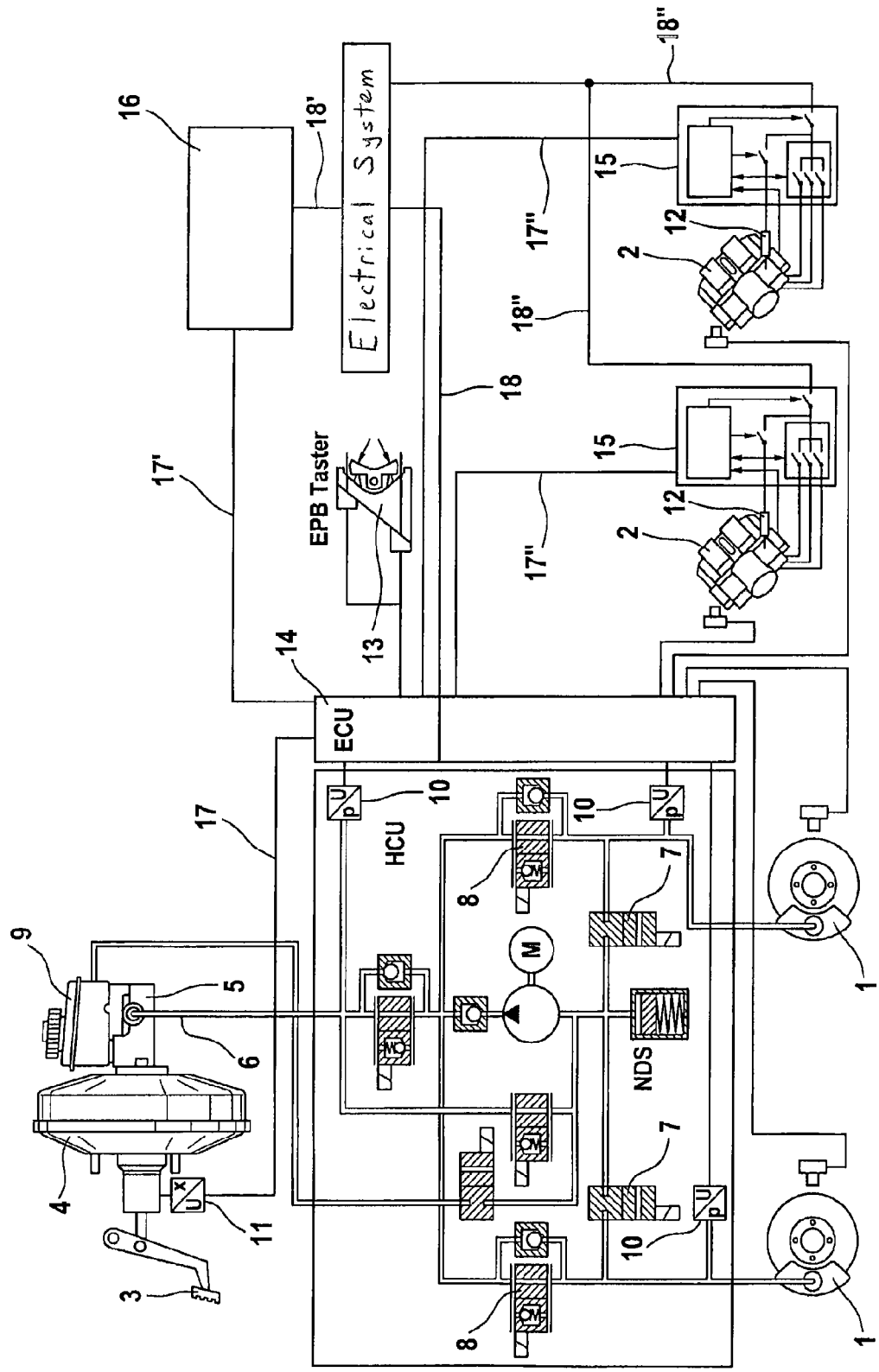

METHOD FOR OPERATING A VEHICLE BRAKE SYSTEM AND VEHICLE BRAKE SYSTEM

CROSS REFERENCE TO RELATED APPLICATIONS

This application is the U.S. national phase application of PCT International Application No. PCT/EP2008/054014, filed Apr. 3, 2008, which claims priority to German Patent Application No. DE 10 2007 016 422.1, filed Apr. 5, 2007 and German Patent Application No. DE 10 2008 017 478.5, filed Apr. 3, 2008, the contents of such applications being incorporated herein by reference.

FIELD OF THE INVENTION

The invention relates to a method for operating a vehicle brake system, in particular for motor vehicles having a hybrid drive or electric drive, having preferably hydraulically actuable wheel brakes, which apply a braking torque, at one or more of the vehicle axles, in particular a front axle, wherein in particular the vehicle wheels which are assigned to a rear axle are driven at least partially by an electric motor which can be operated as a generator in order to recover (regenerate) braking energy, and in the generator mode said electric motor applies a braking force (regeneration torque) to the vehicle wheels which are assigned to the respective axle, as a result of which a wheel or drag torque which is formed from the braking torque and the regeneration torque of the electric drives and which can be controlled separately at the front axle and the rear axle is produced.

DESCRIPTION OF THE RELATED ART

In vehicles having a hybrid drive, the drive can be provided either by means of an internal combustion engine or by means of an electric motor; in an electric vehicle the drive is provided exclusively by the electric motor. In these vehicles, brake systems in which at least a portion of the energy recovered during braking can be stored in the vehicle and re-used to drive the vehicle are already known. This permits the overall consumption of energy of the vehicle to be lowered and the efficiency to be increased, so that operation is made more economic. Motor vehicles with such a brake system which is configured for what is referred to as "regenerative braking" generally have different types of brakes which are also referred to as "brake actuators".

Hydraulic friction brakes such as are known from conventional motor vehicles are usually employed for braking the wheels of the front axle and/or of the rear axle. If appropriate, electromechanically actuable friction brakes can be used for braking the wheels of the rear axle. Furthermore, an electric motor is used which can be operated as a generator. At least a portion of the total braking force is applied by the generator or the electric motor which is in the generator mode. The electric energy which is acquired is fed or fed back into a storage medium, such as, for example, an on-board battery and re-used to drive the motor vehicle by means of a suitable drive.

During the braking of such a motor vehicle which has an electric motor as the sole drive or as an additional drive and which serves to recover braking energy in the generator mode, a further braking torque is applied by the electric motor in addition to the braking torque of the wheel brakes which can be actuated hydraulically and electromechanically and which is applied by the brake system which is actuated by the driver. This braking torque of the electric motor is produced from the known effect in electric motors which act as a dynamo or generator and generate electric current when they are driven mechanically without electric current being supplied. In this context, an opposing force, which counteracts the mechanical drive and acts as a braking torque in the present case, is produced. The electric motor which is operated as a generator therefore also acts as a brake. The total braking force of the motor vehicle is therefore composed of the braking force of the hydraulically actuable wheel brakes, the braking force of the electromechanically actuable wheel brakes and the braking force of the electric motor acting as a generator ("regeneration torque"), and is also referred to as wheel torque or drag torque.

DE 103 19 663 A1 discloses a method for setting the pedal characteristic curve of a hybrid brake system with a variable distribution of braking force. In the known method for operating a brake system which comprises a hydraulic service brake system and an electric service brake system with wheel brakes to which brake pressure is applied when a brake pedal is actuated, a control device actuates a brake pressure modulator of the hydraulic service brake system and the electric service brake system in such a way that when there is a change in the distribution of braking force between the hydraulic service brake system and the electric service brake system the ratio of the pedal force and/or pedal travel to the total braking torque of the vehicle remains essentially constant. An electric motor which can be operated as a generator is not provided.

The potential of recovery of the braking energy for a combined vehicle brake system of the type mentioned in the beginning and given distribution of the braking force from the front axle to the rear axle of 50% to 50% is correspondingly 50%. For the lower deceleration range, it is, however, considered possible and permissible to increase greatly the portion of braking force at the rear axle in relation to the front axle.

In vehicles with hybrid drives or electric drives, the electric generator is active at one or both vehicle axles as soon as the driver takes his foot off the accelerator pedal or brakes. The resulting braking torque or else drag torque, which also serves to recover (regenerate) energy, can lead to a reduction in the adhesion at the vehicle wheels extending as far as loss of adhesion. If this occurs to a greater extent at the rear axle, the rear axle is said to be overbraked. Since no lateral guidance forces can be transmitted any longer at an overbraked rear axle, this leads to a loss of driving stability, which can result in the vehicle veering or skidding.

SUMMARY OF THE INVENTION

An object of the invention is therefore to provide a method for operating a vehicle brake system which prevents overbraking of the rear axle and therefore loss of vehicle driving stability, and also a corresponding vehicle brake system.

This object is achieved according to aspects of the invention in that a regeneration torque which is present at a vehicle axle is subjected to open or closed-loop control in such a way that the drag torque which is present at the vehicle axle does not exceed a maximum drag torque value which is assigned to this axle.

There is preferably provision here that the maximum drag torque value of an axle can be changed in the course of the operation of the motor vehicle and is adapted to the changed conditions. Changed conditions may be, for example, a change in the underlying surface of the vehicle (due to rain, for example) or a changed state of the vehicle due to driving with different tires, for example.

In one preferred exemplary embodiment, the maximum drag torque value of each rear axle is lower than the minimum of the drag torques which are present at the front axles. Overbraking of the rear axles is therefore effectively prevented because it is ensured, even when there are a plurality of rear axles, that the rear axles are not subjected to overbraking and can therefore supply the necessary lateral forces for ensuring stability of the motor vehicle.

In the range of low vehicle decelerations the portion of the total applied braking force, i.e. the braking force which is desired by the driver or required by the brake system, including the braking force which is applied by the regeneration, is distributed according to aspects of the invention among the vehicle axles in such a way that the portion of the total braking force which is present at the vehicle wheels of the at least one rear axle is greater than the portion of the total braking force which is present at the vehicle wheels of the front axle.

In this context, the portion of the braking force which is present at the vehicle wheels of the rear axle can be generated exclusively, or virtually exclusively, by the electric motor which is in the generator mode.

In this context there is provision according to aspects of the invention that the braking force at the hydraulic wheel brakes is between 0% and 49% of the braking force for the total motor vehicle, while the braking force which is generated by the electric motor which is in the generator mode is between 51% and 100% of the braking force for the total motor vehicle.

Since the driving stability at the respective axle is decisively determined by the coefficient of friction which is present at the wheels, according to a preferred embodiment the maximum drag torque value of each rear axle is determined as a function of whether an estimated future coefficient of friction which is present at a front axle exceeds a reference coefficient of friction which is assigned to the respective front axle. In this context, the maximum drag torque value for a rear axle can be determined from the coefficients of friction which are present at a front axle by means of the distance between at least one predefined further reference coefficient of friction or a characteristic curve which is defined in a coefficient of friction interval, or by means of a physical calculation of the maximum drag torque value from the coefficient of friction or the coefficients of friction of the front axle.

In a development of this inventive idea there is provision that the estimated future coefficient of friction which is present at a front axle is determined from monitoring the wheel speeds with a slip model and/or monitoring the wheel speeds with an oscillation model and/or monitoring the wheel dynamics and/or a vehicle movement dynamics monitor and/or a vehicle-to-vehicle communication and/or a vehicle-to-infrastructure communication and/or a sensor for acquiring coefficient of friction information. In the case of vehicle-to-vehicle communication and/or vehicle-to-infrastructure communication, external information is used with which conclusions can be drawn about overbraking of the rear axle. This information may be, for example, coefficient of friction information or information about slipperiness or information about hazardous situations (accidents, traffic jams). A vehicle movement dynamics monitor uses the sensor variables (for example ESP sensor system) available to it to monitor the motor vehicle and to estimate the associated coefficient of friction.

In a further exemplary embodiment, the open-loop and/or closed-loop control of the drag torque which is present at the respective axle is carried out as a result of at least one wheel dynamics characteristic variable being monitored with respect to a sudden reduction in adhesion between a tire or tires and the underlying surface, for example the wheel rotational speed, the wheel rotational acceleration, the vehicle longitudinal acceleration, the vehicle speed and/or the wheel load. The occurrence of a sudden reduction in adhesion can be detected, for example, by a sudden increase in the rotational speed of the respective vehicle wheel. A sudden reduction in adhesion has the result that the maximum drag torque value which is to be assigned to the corresponding axle is also exceeded. In such a case, the drag torque which is present at this axle is firstly reduced by reducing the regeneration portion of the braking force for this axle. If no regeneration torque is present at the axle or the regeneration torque is already reduced to a maximum degree, the conventional braking force which is present at the axle is then reduced. In particular it is advantageous if the system (regeneration portion or portion of the conventional braking force) with the relatively high dynamics is reduced so that the vehicle wheel is quickly adjusted out of the range in which there is a risk of a sudden reduction in adhesion, and a stable state is achieved. With respect to the wheel load it is to be noted that the maximum drag torque value also depends on the wheel load since the wheel load determines the force acting vertically on the contact region between the underlying surface and the vehicle wheel.

All the forces acting on a vehicle are transmitted to the tires. This transmission force is characterized by the adhesion coefficient or else coefficient of tangential force. It is defined as a quotient of the tangential force of the tire and the wheel load and is heavily dependent on various influences such as, for example, the texture of the underlying surface, the covering of the underlying surface, the travel speed, the temperature, pressure per unit surface area, internal pressure of the tire, profile depth, tire skew, type of tire. The friction which occurs in the process is dependent on the tire slip, as well as on the above-mentioned influences. This is highly significant for braking processes.

Wheel slip denotes the ratio of a driven tire to a wheel which is entrained in an idling fashion, and in the case of braking the slip here is between 0% (a wheel which is being entrained in an idling fashion and a tire which is being driven rotate at the same speed) and 100% (locking of the vehicle wheels). In the case of a slip value which is usually below 15%, the coefficient of friction/slip curve and the coefficient of tangential force/slip curve or adhesion coefficient/slip curve are also at a maximum value at which the force transmission of the tire to the underlying surface is at an optimum, but, when this maximum is exceeded, the sudden reduction in adhesion occurs and therefore the vehicle wheels lock. For this reason, the slip is controlled by means of a slip controller in such a way that the slip remains below this maximum value.

If the motor vehicle has a slip controller, at least at a rear axle, the open-loop and/or closed-loop control of the drag torque which is present at the respective axle is advantageously carried out by means of a slip controller with which the slip which is present at a vehicle wheel of a rear axle is monitored with respect to a sudden reduction in adhesion between a tire or tires and the underlying surface by means of the vehicle speed and the wheel speed. The adjustment of the slip which occurs as a result of this prevents a sudden reduction in adhesion at the corresponding axles. In a development of this inventive idea, the slip which is present at the corresponding vehicle wheels is controlled around the maximum of the coefficient of friction in the coefficient of friction/slip curve.

The monitoring of the slip at a vehicle wheel preferably is carried out in such a way that the slip is adjusted either to a predetermined reference slip value which is assigned to the respective vehicle wheel, or, during a control the maximum slip value is determined on the basis of an estimate of the coefficient of friction with respect to the vehicle wheels of the respective axle. In this context, the vehicle speed which is necessary for the calculation of slip is estimated from typical vehicle sensors (for example by means of the wheel speed) or is measured with a sensor for measuring the absolute vehicle speed. If a combined braking torque and regeneration torque are present, it is necessary to decide, as a function of the dynamics of the brake system and of the regeneration system, which torque is modulated in order to prevent overbraking of the rear axle.

According to a further exemplary embodiment according to aspects of the invention, the open-loop and/or closed-loop control of the drag torque which is present at a vehicle axle is carried out as a result of a drag torque pulse and/or a braking torque pulse being applied at first only to the front axle of the motor vehicle, and in that the optimum slip torque distribution for the front axle and the rear axle is then determined from the analysis of the torque behavior, slip behavior, coefficient of friction behavior and/or wheel dynamics behavior of the motor vehicle occurring at the respective axle, and is set. In this context, firstly the total drag torque can be transmitted via the front axle and then subsequently distributed to the front axle and the rear axle.

The method according to aspects of the invention can be implemented with a vehicle brake system which is intended in particular for motor vehicles with a hybrid drive or an electric drive, with preferably hydraulically actuable wheel brakes on a first vehicle axle, in particular the front axle, and with preferably electromechanically actuable wheel brakes, in particular on a second vehicle axle or on a plurality of the vehicle axles, in particular on the rear axle, and with an open-loop and/or closed-loop control unit, in which case in particular the vehicle wheels which are assigned to the rear axle are driven at least partially by an electric motor which can be operated as a generator in order to recover (regenerate) braking energy, and in the generator mode said electric motor applies a braking force (regeneration torque) at the vehicle wheels which are assigned to the respective axle, as a result of which a drag torque which is formed from the braking torque and the regeneration torque of the electric drives and which can be controlled separately at the front axle and the rear axle is produced, and in which vehicle brake system the open-loop and/or closed-loop control unit performs open-loop or closed-loop control on a regeneration torque which is present at a vehicle axle in such a way that the drag torque which is present at the vehicle axle does not exceed a maximum drag torque value which is assigned to this axle.

BRIEF DESCRIPTION OF THE DRAWINGS

Further features, advantages and application possibilities of the invention emerge from the following description of an exemplary embodiment which is illustrated in a single FIGURE.

FIG. 1 shows a circuit diagram of a combined vehicle brake system according to an exemplary embodiment of the invention having hydraulically actuable wheel brakes at the front axle, electromechanically actuable wheel brakes at the rear axle and an electric motor for regenerative braking.

DETAILED DESCRIPTION OF THE PREFERRED EMBODIMENT

The vehicle brake system which is illustrated schematically in the circuit diagram and with which the present method can be carried out has hydraulically actuable wheel brakes 1 and electromechanically actuable wheel brakes 2.

The hydraulically actuable wheel brakes 1 are arranged on a first axle, the front axle of the motor vehicle, and hydraulic pressure medium is applied to them by means of a pedal-actuated vacuum brake booster 4 with master cylinder 5 connected downstream. For this purpose, the hydraulically actuable wheel brakes 1 are connected to the master cylinder 5 via a hydraulic line 6 with intermediate connection of inlet valves 8. When there is a reduction in pressure, the applied pressure medium is discharged via outlet valves 7 into a pressureless pressure medium reservoir vessel 9. In order to measure the applied hydraulic pressure and to carry out control processes, such as anti-lock brake control processes, a plurality of pressure sensors 10 are provided, the output signals of which are fed to a central open-loop and closed-loop control unit 14.

As is also apparent from FIG. 1, electromechanically actuable wheel brakes 2 are arranged on a second axle, the rear axle of the motor vehicle, and they can be actuated in accordance with the hydraulic pressure which is applied to the hydraulically actuable wheel brakes 1. As already mentioned, the pressure which is applied to the hydraulically actuable wheel brakes 1 is measured by means of the pressure sensors 10. On the basis of this pressure value, the electromechanically actuable wheel brakes 2 on the rear axle are driven, i.e. a brake application force of the electromechanically actuable wheel brakes 2 is set taking into account a braking force distribution function between the front axle and the rear axle. Furthermore, the electromechanically actuable wheel brakes 2 are driven in accordance with the actuation travel of the brake pedal 3, i.e. in accordance with the vehicle driver's request. For this purpose, the actuation travel of the brake pedal 3 is measured by means of a pedal travel sensor 11. The driving of the electromechanically actuable wheel brakes 2 is performed in decentralized fashion by means of two electronic control units 15 which are each assigned to an electromechanically actuable wheel brake 2. The supply of electrical energy is provided via a supply line 18" which connects the electromechanically actuable wheel brakes 2 to the on-board power system.

As is only indicated schematically in FIG. 1, the electromechanically actuable wheel brakes 2 have a parking brake device 12 with which the wheel brakes can be locked in the applied state in order to carry out parking braking. The parking brake device 12 can be driven by means of an operator control element 13 which is embodied as an electromechanically actuable wheel brake (EPB). The operator control element 13 is embodied as a pushbutton switch and has three switched positions for the commands "apply", "neutral" and "release", with only the central neutral position constituting a stable switched position.

The driver's braking request is, as already mentioned, sensed by the pedal travel sensor 11 and fed to the electronic open-loop and closed-loop control unit 14 via a signal line 17. Furthermore, the signals of the operator control element 13 of the parking brake are fed to the open-loop and closed-loop control unit 14. The two decentralized electronic control units 15 of the electromechanically actuable wheel brakes 2 are also connected to the open-loop and closed-loop control unit 14 via a signal line 17".

An electric motor 16 which, on the one hand, acts as a sole drive in an electric car or as an additional drive in a vehicle with an internal combustion engine and, on the other hand, in the generator mode is used to recover braking energy is connected to the open-loop and closed-loop control unit 14 via a further signal line 17'. In the case of driving, the electric motor 16 draws its supply voltage from the on-board power system via a supply line 18', and in the generator mode it feeds electrical energy back into the on-board power system via the same supply line 18'. In the generator mode just mentioned, the electric motor 16 acts as a dynamo and generates electric current. In this context, an opposing force, which acts as a further braking torque (regeneration torque), is produced. The electric motor 16 which is operated as a generator acts as a brake here. The total braking force of the motor vehicle is therefore composed of the braking force of the hydraulically actuable wheel brakes 1, the braking force of the electromechanically actuable wheel brakes 2 and the braking force of the electric motor 16 which is acting as a generator. These three braking forces have to be adapted in a suitable way, and this is made possible by a suitable braking force distribution.

This is carried out by the open-loop and closed-loop control unit 14. The latter determines, on the basis of the braking request of the driver which is sensed by the pedal travel sensor 11 and the various external influences, the total desired or necessary braking force and distributes it among the hydraulically actuable wheel brakes 1, the electromechanically actuable wheel brakes 2 and the electric motor 16 which is operated in the regeneration mode. In this context, the regeneration torque which is present at least one axle is controlled in such a way that the drag torque which is present at this axle does not exceed a maximum drag torque value which is assigned to this axle.

Because the rear axle can therefore always be adjusted to a lower drag torque than that which is present at the front axle, overbraking of the rear axle and therefore a loss of driving stability are prevented.

The overbraking of wheels can be avoided by means of open-loop or closed-loop control interventions. In the case of open-loop control interventions, a maximum slip is predefined. The maximum slip can be permanently set here and result from an estimate of the coefficient of friction or the like. In the case of closed-loop control interventions, the system behavior of the tires is monitored on the basis of a variety of state variables. The adaptation of the wheel slip generally by reducing the torque is common to all the approaches. If combined braking torque and regeneration torque is present, it is necessary to decide, as a function of the dynamics of the brake system and of the regeneration system, which torque is modulated in order to prevent overbraking.

The coefficient of friction information can originate here from various sources:
(1) monitoring of the wheel speeds with a slip model;
(2) monitoring of the wheel speeds with an oscillation model;
(3) monitoring of the wheel dynamics;
(4) vehicle movement dynamics monitor which uses the available sensor variables (for example ESP sensor system) to monitor the vehicle and estimate the coefficient of friction;
(5) Vehicle-to-vehicle communication/vehicle-to-infrastructure communication (use of external information with which conclusions can be drawn about overbraking of the rear axle, for example coefficient of friction information or information on slipperiness or detected hazardous situations (accidents, traffic jams, etc.); or
(6) use of at least one sensor for acquiring at least one coefficient of friction information item (for example coefficient of friction high or coefficient of friction low).

The rear axle can also have means for monitoring the wheel dynamics. A sudden reduction in the adhesion of the tires is prevented by monitoring the wheel dynamics (rotational speed, rotational acceleration, vehicle status variables).

Finally, at least the rear axle can have a slip controller. The vehicle speed and the wheel speed can be used to determine and control the wheel slip precisely. A sudden reduction in the adhesion of the tires is prevented by setting a specific slip. The slip here can either be permanently predefined or adapted using results of an estimate of the coefficient of friction. The vehicle speed can be estimated from the measurement results of typical vehicle sensors or be measured with a sensor for measuring the absolute vehicle speed.

However, it is also possible firstly to apply a drag torque or a torque pulse only to the front axle. The optimum slip torque distribution for the front axle and rear axle is determined by analyzing the slip processes at the front axle (forces, wheel dynamics, coefficient of friction), and set. It is conceivable here firstly to transmit the total desired drag torque via the front axle and then subsequently distribute it.

The invention claimed is:

1. A method for operating a vehicle brake system for motor vehicles having a hybrid drive or electric drive and hydraulically actuable wheel brakes which apply a braking torque at one or more of the vehicle axles including a front axle,
wherein vehicle wheels which are assigned to a rear axle of the vehicle are driven at least partially by an electric motor which can be operated as a generator in order to regenerate braking energy, and
wherein, in a generator mode, said electric motor applies a regeneration torque to the vehicle wheels which are assigned to a respective axle, as a result of which a drag torque which is formed from the braking torque and the regeneration torque of the electric drives and which can be controlled separately at the front axle and the rear axle is produced,
wherein a regeneration torque which is present at a vehicle axle is subjected to open-loop control or closed-loop control in such a way that the drag torque which is present at a vehicle axle does not exceed a maximum drag torque value which is assigned to that vehicle axle, and
wherein a maximum drag torque value of each rear axle is determined as a function of whether an estimated future coefficient of friction which is present at a front axle exceeds a reference coefficient of friction which is assigned to the respective front axle.

2. The method as claimed in claim 1, wherein a maximum drag torque value of an axle can be changed in the course of operating the motor vehicle.

3. The method as claimed in claim 1, wherein a maximum drag torque value of each rear axle is lower than a minimum value of the drag torque which is present at front axles of the vehicle.

4. The method as claimed in claim 1, wherein, in a range of low vehicle deceleration, a total applied braking force is distributed among the vehicle axles in such a way that a portion of the total braking force which is present at the vehicle wheels of at least one rear axle is greater than the portion of the total braking force which is present at the vehicle wheels of the front axle.

5. The method as claimed in claim 4, wherein the total applied braking force is the braking force which is desired by the driver or required by the brake system, including the braking force which is applied by the regeneration.

6. The method as claimed in claim 1, wherein the estimated future coefficient of friction which is present at a front axle is determined from: (i) monitoring wheel speeds with a slip model, (ii) monitoring the wheel speeds with an oscillation model, (iii) monitoring wheel dynamics, (iv) monitoring a vehicle movement dynamics monitor, (v) monitoring a vehicle-to-vehicle communication, (vi) monitoring a vehicle-to-infrastructure communication, (vii) monitoring a sensor for acquiring coefficient of friction information, or (viii) any combination of (i) through (vii).

7. The method as claimed in claim 1, wherein the open-loop control and/or closed-loop control of the drag torque which is present at the respective axle is carried out as a result of at least one wheel dynamics characteristic variable being monitored with respect to a sudden reduction in adhesion between a tire or tires and an underlying road surface.

8. The method as claimed in claim 7, wherein the variable being monitored is a rotational speed, a rotational acceleration, a vehicle speed, a wheel load, or any combination thereof.

9. The method as claimed in claim 1, wherein the open-loop control and/or closed-loop control of the drag torque which is present at the respective axle is carried out by a slip controller with which a slip which is present at a vehicle wheel of a rear axle is monitored with respect to a sudden reduction in adhesion between a tire or tires and an underlying road surface.

10. The method as claimed in claim 9, wherein the monitoring of the slip at a vehicle wheel is carried out in such a way that the slip is adjusted either to a predetermined reference slip value which is assigned to the respective vehicle wheel, or the maximum slip value is determined on a basis of an estimate of a coefficient of friction with respect to the vehicle wheels of the respective axle.

11. The method as claimed in claim 1, wherein the open-loop control and/or closed-loop control of the drag torque which is present at a vehicle axle is carried out as a result of a drag torque pulse and/or a braking torque pulse being applied to the front axle of the motor vehicle, and wherein an optimum slip torque distribution between the front axle and the rear axle is determined from an analysis of (i) torque behavior, (ii) slip behavior, (iii) coefficient of friction behavior, (iv) wheel dynamics behavior of the motor vehicle occurring at the respective axle, or (v) any combination of (i) through (iv), and the optimum slip torque distribution is set.

12. The method as claimed in claim 11, wherein firstly a total desired or necessary drag torque is supported via the front axle and is then distributed to the front axle and the rear axle.

13. A motor vehicle brake system for motor vehicles having a hybrid drive or electric drive and hydraulically actuable wheel brakes which apply a braking torque at one or more of the vehicle axles including a front axle, said brake system comprising:
  an open-loop control unit and/or closed-loop control unit, wherein vehicle wheels which are assigned to a rear axle are driven at least partially by an electric motor which can be operated as a generator in order to regenerate braking energy,
  wherein, in a generator mode, said electric motor applies a regeneration torque to the vehicle wheels which are assigned to a respective axle, as a result of which a drag torque which is formed from the braking torque and the regeneration torque of the electric drive and which can be controlled separately at the front axle and the rear axle is produced,
  wherein the open-loop control unit and/or closed-loop control unit is configured to perform open-loop control or closed-loop control on a regeneration torque which is present at a vehicle axle in such a way that the drag torque which is present at the vehicle axle does not exceed a maximum drag torque value which is assigned to that vehicle axle, and
  wherein a maximum drag torque value of each rear axle is determined as a function of whether an estimated future coefficient of friction which is present at a front axle exceeds a reference coefficient of friction which is assigned to the respective front axle.

* * * * *

UNITED STATES PATENT AND TRADEMARK OFFICE
CERTIFICATE OF CORRECTION

PATENT NO.       : 8,442,737 B2
APPLICATION NO.  : 12/594274
DATED            : May 14, 2013
INVENTOR(S)      : Seurer et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 892 days.

Signed and Sealed this
Eighth Day of September, 2015

Michelle K. Lee
*Director of the United States Patent and Trademark Office*